United States Patent

Nakamura

[11] 4,089,307
[45] May 16, 1978

[54] THROTTLE VALVE OPERATING MECHANISM

[75] Inventor: Koyo Nakamura, Yokosuka, Japan

[73] Assignee: Nissan Motor Company, Limited, Japan

[21] Appl. No.: 655,450

[22] Filed: Feb. 5, 1976

[30] Foreign Application Priority Data

Feb. 10, 1975 Japan .................. 50-17106

[51] Int. Cl.² ............................................. F02D 33/00
[52] U.S. Cl. ................................ 123/97 B; 123/103 E
[58] Field of Search ................ 123/97 B; 60/276, 285

[56] References Cited

U.S. PATENT DOCUMENTS

| | | | |
|---|---|---|---|
| 3,556,064 | 1/1971 | Date | 123/97 B |
| 3,721,222 | 3/1973 | Shioya | 123/97 B |
| 3,768,259 | 10/1973 | Carnahan | 60/285 |
| 3,805,760 | 4/1974 | Yagi | 123/97 B |
| 3,881,685 | 5/1975 | Hase | 123/97 B |

FOREIGN PATENT DOCUMENTS 1,955,031 11/1969 Germany .................. 123/97 B

Primary Examiner—Clarence R. Gordon
Attorney, Agent, or Firm—Robert E. Burns; Emmanuel J. Lobato; Bruce L. Adams

[57] ABSTRACT

An internal combustion engine having at the intake system an electronically controlled carburetor with a throttle valve and in the exhaust system a three-way catalytic converter, the carburetor being operated in response to the composition of exhaust gases entering the three-way catalytic converter. A dashpot mechanism is connected to the throttle valve of the carburetor to damp the returning movement of the throttle valve. Furthermore, a throttle valve opening mechanism is provided to the carburetor to open slightly the throttle valve when a certain vacuum is created in the intake system downstream of the throttle valve.

2 Claims, 3 Drawing Figures

THROTTLE VALVE OPERATING MECHANISM

BACKGROUND OF THE INVENTION

The present invention relates in general to an exhaust gas purifying system used with an internal combustion engine of a motor vehicle and more particularly to a throttle valve operating mechanism for an electronically controlled carburetor of the internal combustion engine having at the exhaust system a three-way catalytic converter, the electronically controlled carburetor being operated in response to the state of the exhaust gases entering the three-way catalytic converter.

It is recognized that a three-way catalytic converter comprising catalysts or a catalyst capable of converting harmful exhaust compounds such as hydrocarbons (HC), carbon monoxide (CO) and nitrogen oxides ($NO_x$) into harmless compounds performs at its maximum when the air-fuel mixture supplied into the combustion chambers of the engine is kept within a close range of the stoichiometric air-fuel ratio. An electronically controlled carburetor is therefore used in the above-mentioned internal combustion engine system by reason of its increased accuracy in controlling fuel ratio. This kind of a carburetor is so-called "feedback type air-fuel ratio controlling carburetor" which can electronically control the amount of fuel and accordingly the air-fuel mixture to be introduced into an intake manifold of the internal combustion engine by the valving operation of an electric actuator operated in accordance with the composition of the exhaust gases, for example, the concentration of oxygen in the exhaust gases.

Indeed, the above-mentioned electronically controlled carburetor can effectively perform with the three-way catalytic converter when the vehicle is driven normally. However, in a rapid deceleration of the engine due to the rapid release of driver's foot from the accelerator, the electronically controlled carburetor is subjected to the following drawback: owing to a high vacuum in the intake manifold during the deceleration of the engine, a considerable amount of exhaust gases is drawn back into the cylinders of the engine so that the combustible mixture is too lean for normal ignition, besides, the quantity of mixture fed into each cylinder is reduced to a minimum, which again results in misfire.

A number of solutions to these problems has been proposed, one of which is to supply additional or supplementary fuel or mixture into the intake manifold upon engine deceleration for complete combustion in the combustion chamber. One arrangement of this is well shown in U.S. Pat. No. 3,852,391 registered on Dec. 3, 1974 in which a by-pass passage for additional mixture is provided within the carburetor, the passage being opened by a valve sensitive to high vacuum in the intake manifold to allow additional mixture into the intake manifold.

However, this arrangement has not been very effective in respect to the exhaust gas purifying system including the above-mentioned three-way catalytic converter and the electronically controlled carburetor. This is caused by that even if the additional fuel or mixture is supplied into the intake manifold by the operation of such an arrangement upon engine deceleration, the stoichiometric air-fuel ratio is immediately set in the intake manifold by the electronically controlled carburetor thereby causing the above-mentioned drawbacks. Although it is possible to normally combust fuel during the engine deceleration by stopping the electronical control of the carburetor, the harmful compounds in exhaust gases such as hydrocarbons (HC), carbon monoxide (CO) and nitrogen oxides ($NO_x$) are not effectively converted by the three-way catalytic converter by the reasons before mentioned.

SUMMARY OF THE INVENTION

Accordingly, the present invention contemplates provision of a new and useful throttle valve operating mechanism for an electronically controlled carburetor of an internal combustion engine provided with a three-way catalytic converter in the exhaust system, which mechanism can eliminate the drawbacks encountered in the prior art.

Another object of the present invention is to provide a throttle valve operating mechanism which allows the three-way catalytic converter maximum performance even under engine deceleration.

Another object of the present invention is to provide a throttle valve operating mechanism which can provide each of the combustion chambers of the internal combustion engine with a normal combustion of fuel even under engine deceleration.

Another object of the present invention is to provide a throttle valve operating mechanism with a dashpot mechanism.

Still another object of the present invention is to provide a throttle valve operating mechanism having means for slightly opening the throttle valve of the electronically controlled carburetor during engine deceleration.

A further object of the present invention is to provide a throttle valve operating mechanism which can readily be installed in an electronically controlled carburetor.

BRIEF DESCRIPTION OF THE DRAWINGS

These and other features and advantages of the present invention will become more apparent from the following description when taken in conjunction with the accompanying drawings, in which.

DESCRIPTION OF THE PREFERRED EMBODIMENT

Figure 1:
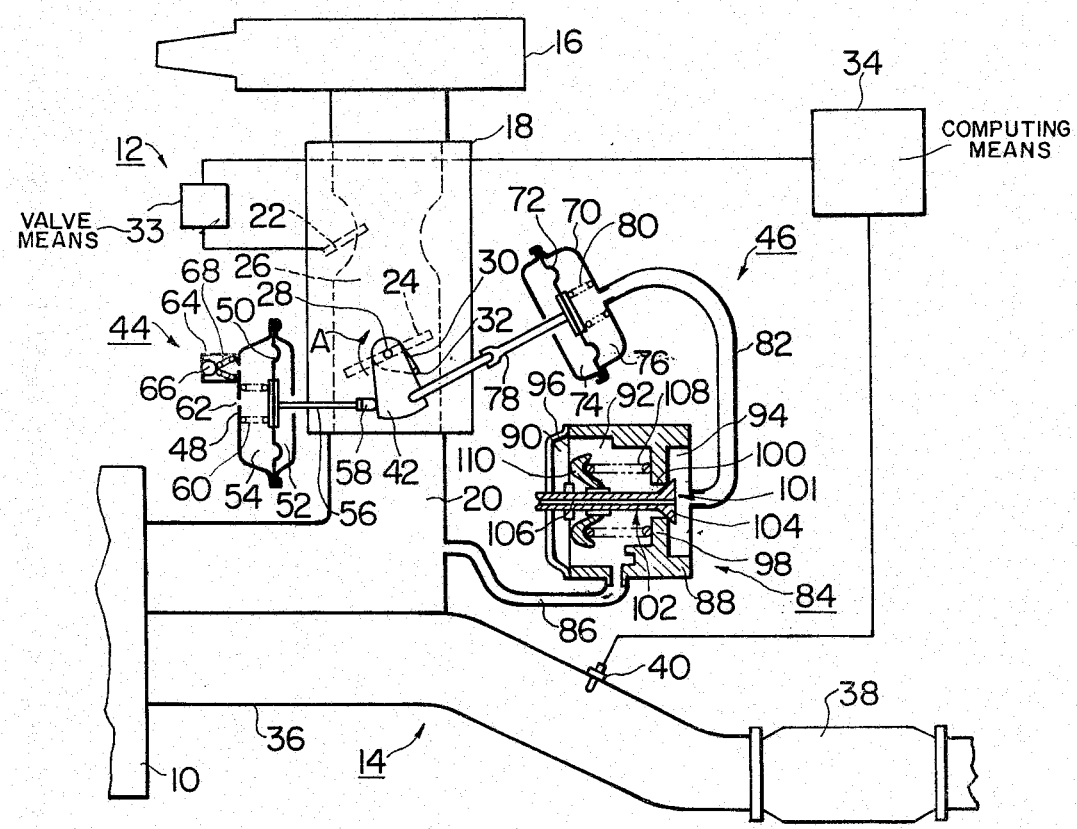
FIG. 1a is a schematic view illustrating a throttle valve operating mechanism according to the present invention, the mechanism being shown as incorporated in an electronically controlled carburetor of an internal combustion engine having at the exhaust system a three-way catalytic converter.
FIG. 1B is an enlarged perspective view of a detail of the throttle valve in FIG. 1A.
Figure 1B:
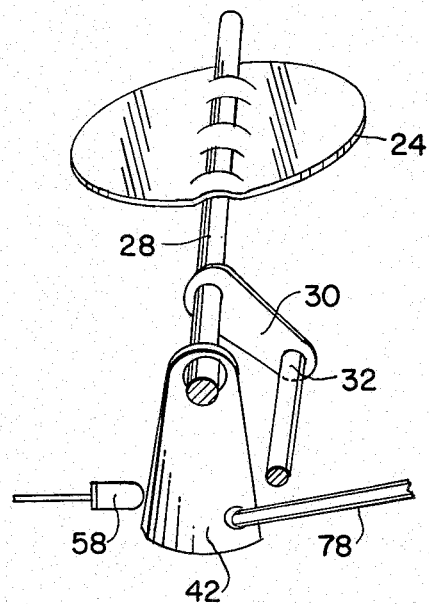

Referring now to FIGS. 1A and 1B there is shown an internal combustion engine 10 incorporating an intake system and an exhaust system which are generally designated by numerals 12 and 14, respectively.

The intake system generally comprises an air filter 16, an electronically controlled carburetor 18 in which a throttle valve operating mechanism proposed by the present invention is incorporated, and an intake tube 20. As shown, the electronically controlled carburetor 18 includes a fuel nozzle 22 projected into a venturi portion (no numeral), a throttle valve or plate 24 rotatably mounted within an air-fuel mixture passage 26 downstream of the verturi portion for controlling the amount of intake air and accordingly the air-fuel mixture composition to be fed to the engine cylinders (not shown). The throttle valve 24 is fixedly connected to a throttle shaft 28 for rotational movement therewith. Fixedly coupled onto the throttle shaft 28 is a lever 30 which is formed with a projection 32 at the lower end thereof. The projection 32 is formed to project toward this side with respect to the surface of this drawing. Although not shown in this drawing, a returning spring is arranged in the passage 26 so as to urge the throttle valve 24 to rotate in a closing direction. The electronically controlled carburetor 18 further includes electromagnetically controlled valve means 33 for electronically controlling the amount of fuel passing through the fuel nozzle 22 in accordance with instructions given by a computing means 34. The description of the computing means 34 will be made hereinafter.

The exhaust system 14 generally comprises an exhaust tube 36 and a three-way catalytic converter 38 containing therein a catalyst or catalysts capable of converting hydrocarbons (HC), carbon monoxide (CO) and nitrogen oxides ($NO_x$) into harmless compounds.

Projected into the exhaust tube 36 at a portion upstream of the three-way catalytic converter 38 is an exhaust gas sensor 40 such as an oxygen sensor which sends information signals about the exhaust gas oxygen concentration in the exhaust tube 36 to the computing means 34. Upon receiving the signals from the sensor 40, the computing means 34 issues appropriate command signals to the valve means 33 of the electronically controlled carburetor 18 for preferably controlling the amount of fuel passing through the fuel nozzle 22 so as to provide a stoichiometric air-fuel ratio for each cylinder of the internal combustion engine 10. These computing means having the above-stated functions are well known to those skilled in the art.

Referring back to the throttle valve 24 of the electronically controlled carburetor 18, a swingable arm 42 is rotatably connected at its upper end to the throttle shaft 28 in such a manner that the right side edge of the swingable arm 42 is engaged with the projection 32 of the lever 30 when rotated in a counterclockwise direction in a predetermined angle.

A throttle valve operating mechanism according to the present invention is shown to associate with the swingable arm 42. The throttle valve operating mechanism of the invention generally comprises two sections one of which is a dashpot mechanism 44 and the other of which is a throttle valve opening mechanism 46.

The dashpot mechanism 44 comprises a casing 48. A flexible diaphragm 50 is disposed in the casing 48 so as to divide the same into first and second chambers 52 and 54. The first chamber 52 communicates with the atmosphere through a relatively large opening (no numeral) formed in the casing 48. An operating rod 56 is connected at its one end to the diaphragm 50 and extends from the first chamber 52 into the air-fuel mixture passage 26 of the electronically controlled carburetor 18. Preferably, the leading end of the operating rod 56 is formed with an enlarged head portion 58. As shown, the operating rod 56 is arranged in such a manner that the enlarged head portion 58 faces a lower side left edge portion of the swingable arm 42.

Within the second chamber 54 of the casing 48 is disposed a compression spring 60 which urges the diaphragm 50 toward the first chamber 52. An orifice 62 is formed in the casing 48 for providing limited communication between the second chamber 54 and the atmosphere. A cylindrical member 64 slidably receiving therein a check valve 66 backed by a spring 68 is provided to the casing 48 for permitting entrance of air to the second chamber 54, but closing the passage against exhaust of air therethrough.

The throttle valve opening mechanism 46 comprises a diaphragm unit (no numeral) which has a casing 70, a flexible diaphragm 72 disposed in the casing 70 to divide the inner chamber of the casing 70 into first and second chambers 74 and 76. The first chamber 74 communicates with the atmosphere through an opening. A linkage 78 is connected at its one end to the diaphragm 72 and extends from the first chamber 74 into the air-fuel mixture passage 26 of the electronically controlled carburetor and is pivotally connected at the other end thereof to a lower portion of the swingable arm 42.

Thus, when the diaphragm 72 is moved toward the second chamber 76, the swingable arm 42 is rotated in a counterclockwise direction. Under this condition, if the rotating distance of the swingable arm 42 reaches a predetermined value, the right side edge of the swingable arm 42 is engaged with the projection 32 of the lever 30.

Within the second chamber 76 of the diaphragm unit is disposed a compression spring 80 which urges the diaphragm 72 toward the first chamber 74. The second chamber 76 is communicable with the interior of the intake tube 20 downstream of the throttle valve 24 of the electronically controlled carburetor 18 through a first conduit 82, a controller 84 and a second conduit 86.

The controller 84 comprises a cylindrical casing 88 having first, second and third chambers 90, 92 and 94 therein. A flexible diaphragm 96 sealingly divides the first and second chambers 90 and 92. The first chamber 90 is open to the atmosphere through at least one opening (no numeral). A partition wall 98 arranged in the casing 88 and forming a valve seat 100 at the generally central portion thereof divides the second and third chambers 92 and 94. A valve 101 has a valve plunger 102 with, at one end thereof, a valve head 104 engageable with the valve seat 100. The valve plunger 102 is sealingly passed through and connected to the diaphragm 96 so as to be movable therewith. An air bleed passage 106 is provided through the longitudinal length of the valve plunger 102 so as to provide fluid communication between the third chamber 94 and the atmosphere. The passage 106 has a small bore and thus limits the rate of flow of air passing therethrough. Between the partition wall 98 and the diaphragm 96 is disposed a compression spring 108 which urges the diaphragm 96 toward the first chamber 90 thereby simultaneously urging the valve head 104 into sealing contact with the valve seat 100. A rubber mounting member 110 is disposed between the diaphragm 96 and the spring 108 to protect the diaphragm 96 from damage. The second chamber 92 and the third chamber 94 respectively communicate with the interior of the intake tube 20 and the second chamber 76 of the diaphragm unit by means of the second conduit 86 and the first conduit 82, respectively.

When, in operation, the engine accelerator pedal (not shown) is released to cause deceleration of the engine, the throttle valve 24 is forced, by the action of the returning spring, to rotate clockwise of the drawing, with the lever 30 in a direction to decrease the opening degree thereof (as indicated by the arrow A). Then, the lever 30 is engaged at the projection 32 with the right side edge of the swingable arm 42 so as to force the swingable arm 42 to rotate clockwise. However, upon engagement of the lower side left edge portion of the swingable arm 42 with the enlarged head portion 58 of the operating rod 56 of the dashpot mechanism 44, the returning speed of the swingable arm 42 and accordingly the throttle valve 24 is decreased or dampened to effect smooth deceleration of engine. This is due to the fact that the air in the second chamber 54 exhausts into the atmosphere only through the orifice 62, thus the diaphragm 50 serves as a damping means and gradually moves leftwardly of the drawing to slowly decrease the throttle valve opening. However, in this condition, a certain vacuum is created in the intake tube 20 downstream of the throttle valve 24 due to the decreased opening degree of the throttle valve 24. Thus, when the magnitude of vacuum in the intake tube 20 is above a predetermined level, the diaphragm 96 in the controller 84 is forced to move rightwardly of the drawing against the urging force of the compression spring 108 thereby simultaneously moving the valve plunger 102 rightwardly in a position wherein the valve head 104 of the valve plunger 102 is released from the sealing contact with the valve seat 100. Therefore, vacuum is introduced through the second chamber 92 into the third chamber 94 of the controller 84 and thus into the second chamber 76 of the diaphragm unit through the first conduit 82 thereby causing the diaphragm 72 of the diaphragm unit to move rightwardly of the drawing against the force of the compression spring 80. Thus, the linkage 78 is moved rightwardly while rotating the swingable arm 42 and accordingly, in this case, the lever 30 by the assistance of the projection 32 in a direction to slightly open the throttle valve 24.

Furthermore, when, in this condition, the accelerator pedal is depressed by the vehicle driver to cause the engine acceleration, the throttle valve 24 is quickly rotated with the lever 30 to open the throttle valve 24 against the force of the returning spring (not shown). In this instance, the quick movement of the throttle valve 24 is not prevented by the swingable arm 42. Further, in this condition, the magnitude of vacuum in the intake tube 20 is decreased and becomes smaller than the predetermined level to cause the diaphragm 96 of the controller 84 to return to its normal position (the position illustrated in the drawing) by the action of the compression spring 108 thereby causing the valve head 104 of the valve plunger 102 to sealingly engage with the valve seat 100. Thus, the fluid communication between the second chamber 76 of the diaphragm unit and the interior of the intake tube 20 is cut off. In this instance, the second chamber 76 of the diaphragm unit is filled with air passing through the passage 106 formed in the valve plunger 102 thereby causing the diaphragm 72 to move leftwardly into its home position by the assistance of the urging force of the spring 80. Thus, the swingable arm 42 returns the home position thereof.

Accordingly, with the above-stated construction of the throttle valve operating mechanism of the present invention, the slow returning movement of the throttle valve 24 is established by means of the dashpot mechanism 44, and simultaneously, a slight opening of the throttle valve 24 is provided even at engine deceleration by means of the throttle valve opening mechanism 46. Consequently, not only normal combustion of fuel in the combustion chambers but also effective operation of the three-way catalytic converter are simultaneously made even at rapid deceleration of the engine having the electronically controlled carburetor.

Figure 2:
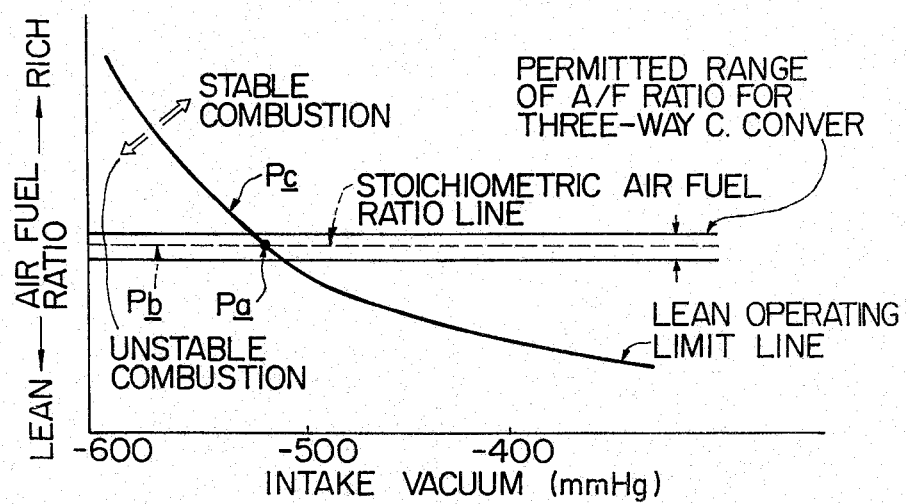
FIG. 2 is a graph illustrating the relationship between the magnitude of the vacuum within an intake manifold and the air-fuel ratio of mixture to be introduced into each of the engine cylinders.

In order to show the advantages of the throttle valve operating mechanism according to the present invention, a graph is presented in FIG. 2 which shows a lean operating limit line, a stoichiometric air-fuel ratio line and a permitted range of the air-fuel ratio for efficient operation of a three-way catalytic converter corresponding to intake vacuum and air-fuel ratio. In this graph, three points Pa, Pb and Pc are indicated for showing the applicability of three kinds of carburetors against the three-way catalytic converter, in which:

Pa: data from an electronically controlled carburetor provided with the mechanism according to the present invention, Pb: data from a conventional electronically controlled carburetor, and Pc: data from a conventional carburetor provided with the arrangement of the above-mentioned U.S. Pat. No. 3,852,391.

Now, it should be appreciated that the point Pa is within a position at which both the lean operating limit line and the stoichiometric air-fuel ratio line meet. This means that the throttle valve operating mechanism of the present invention can provide an internal combustion engine having an electronically controlled carburetor and a three-way catalytic converter with stable combustion of fuel in a stoichiometric air-fuel ratio region even at deceleration of such kind of an engine.

Although, in the previous description, the electronically controlled carburetor is described to be accompanied with both the throttle valve dashpot mechanism 44 and the throttle valve opening mechanism 46, it is also possible that the electronically controlled carburetor is provided with only one of the mechanisms 44 and 46.

In conclusion, with the throttle valve operating mechanism according to the present invention, the creation of an extremely high vacuum in the intake tube is preferably prevented during engine deceleration. Therefore, stable combustion of fuel is provided in each of the combustion chambers without any additional fuel, that is, the stable combustion is made in a generally stoichiometric air-fuel ratio range even at engine deceleration so that the three-way catalytic converter performs at its maximum.

It is to be understood that the invention is not to be limited to the exact construction shown and described and that various changes and modifications may be made without departing from the spirit and scope of the invention, as described in the appended claims.

What is claimed is:

1. In an internal combustion engine system including an internal combustion engine; an intake system having an electrically controlled carburetor with an air-fuel mixture passage and a throttle valve rotatably mounted in said mixture passage; a throttle shaft rotatably mounted said throttle; an exhaust system having therein a three-way catalytic converter capable of converting hydrocarbons, carbon monoxide and nitrogen oxides into harmless compounds; an exhaust gas sensor operatively disposed in said exhaust system upstream of said converter for producing an information signal representing and corresponding to the concentration of a given component of the exhaust gases emitted from said engine; and computing means for controlling said carburetor to provide a substantially stoichiometric air-fuel mixture upon receiving said information signal from said sensor, the improvement comprising a throttle valve operating mechanism connected to said throttle valve for rotating said throttle valve to slightly open said air-fuel passageway when the magnitude of vacuum in said intake system downstream of said throttle valve is higher than a predetermined level, a dashpot mechanism for damping the movement of said throttle valve when said throttle valve is quickly rotated in a direction to close said air-fuel mixture passage in response to rapid engine deceleration whereby creation of extremely high vacuum in said intake system downstream of said throttle valve is prevented even in case of engine deceleration; said throttle valve operating mechanism comprising a lever fixed at the one end thereof to said throttle shaft to rotate therewith, said lever having at the other end thereof a projection; a swingable arm rotatably connected at one end thereof to said throttle shaft and engageable at one side thereof with said projection to rotate said lever and thus said throttle valve in a direction to open said throttle valve when rotated in one direction a predetermined distance; a diaphragm unit having therein a diaphragm movable in response to development of a vacuum therein; a linkage connecting a free end of said swingable arm with said diaphragm to rotate said swingable arm in said one direction upon said development of a vacuum; a controller for providing fluid communication between said diaphragm unit and an interior of said intake system downstream of said throttle valve when the magnitude of vacuum in said intake system downstream of said throttle valve is higher than the predetermined level; said controller comprising a cylinder casing having therein first, second and third chambers, a diaphragm separating said first and second chambers, a partition wall separating said second and third chambers, said partition wall defining a valve seat at the central portion thereof, and said second chamber and third chamber communicating with the interior of said intake system downstream of said throttle valve and said diaphragm unit, respectively; a valve plunger having at one end thereof a valve head and having through the entire longitudinal length thereof an air bleed passage, said valve plunger being sealingly passed through and connected to said diaphragm and arranged such that said valve head is sealably engageable with said valve seat; and a compression spring disposed in said second chamber between said diaphragm and said partition wall to urge said diaphragm toward said first chamber.

2. An internal combustion engine system as claimed in claim 1, further comprising a rubber mounting member disposed between said diaphragm and one end of said compression spring for protecting said diaphragm from damage.

* * * * *